(12) United States Patent
Menzel

(10) Patent No.: US 8,741,971 B2
(45) Date of Patent: Jun. 3, 2014

(54) METHOD FOR OPERATING A FISCHER-TROPSCH SYNTHESIS

(75) Inventor: Johannes Menzel, Waltrop (DE)

(73) Assignee: Thyssenkrupp Uhde GmbH, Dortmund (DE)

( * ) Notice: Subject to any disclaimer, the term of this patent is extended or adjusted under 35 U.S.C. 154(b) by 566 days.

(21) Appl. No.: 12/992,090

(22) PCT Filed: May 7, 2009

(86) PCT No.: PCT/EP2009/003250
§ 371 (c)(1),
(2), (4) Date: Feb. 1, 2011

(87) PCT Pub. No.: WO2009/152895
PCT Pub. Date: Dec. 23, 2009

(65) Prior Publication Data
US 2011/0118366 A1        May 19, 2011

(30) Foreign Application Priority Data

May 28, 2008  (DE) .......................... 10 2008 025 577

(51) Int. Cl.
*C07C 27/00*        (2006.01)

(52) U.S. Cl.
USPC ............ 518/705; 518/700; 518/702; 518/704

(58) Field of Classification Search
USPC .................................. 518/700, 705, 702–704
See application file for complete search history.

(56) References Cited

U.S. PATENT DOCUMENTS

| | | |
|---|---|---|
| 6,306,917 B1 | 10/2001 | Bohn |
| 6,976,362 B2 | 12/2005 | Sheppard et al. |
| 7,300,642 B1 | 11/2007 | Pedersen |
| 7,879,919 B2 | 2/2011 | Ernst et al. |
| 8,106,102 B2 | 1/2012 | Steynberg et al. |
| 2003/0018086 A1 | 1/2003 | Price |
| 2003/0083390 A1 | 5/2003 | Shah |
| 2004/0216465 A1* | 11/2004 | Sheppard et al. ................ 60/781 |
| 2005/0080146 A1* | 4/2005 | Abbott et al. .................. 518/703 |
| 2008/0132588 A1* | 6/2008 | Pedersen et al. .............. 518/711 |
| 2008/0312347 A1 | 12/2008 | Ernst |
| 2009/0186952 A1 | 7/2009 | Steynberg |

FOREIGN PATENT DOCUMENTS

| | | |
|---|---|---|
| EP | 1860063 A | 11/2007 |
| EP | 1935845 A | 6/2008 |
| WO | 2005005576 A | 1/2005 |

\* cited by examiner

*Primary Examiner* — Jafar Parsa
(74) *Attorney, Agent, or Firm* — Lucas & Mercanti, LLP

(57) ABSTRACT

The invention relates to a method and a system for operating a Fischer-Tropsch synthesis, wherein a feed gas comprising CO and $H_2$ from coal gasification (1) is desulfurized and subsequently fed into a Fischer-Tropsch synthesis as an input gas, wherein hydrocarbons are formed from carbonic oxides and hydrogen by catalytic reactions. The hydrocarbons are separated as liquid products (4), and a gas flow comprising CO and CO2 exiting the Fischer-Tropsch synthesis unit (3) is compressed and fed into a conversion stage, wherein CO and steam are transformed into $H_2$ and $CO_2$. In the method according to the invention, the gas exiting the conversion stage is fed back into the Fischer-Tropsch synthesis unit as a gas rich in $H_2$, together with the desulfurized input gas, after the gas is prepared in that $CO_2$ and/or further components other than $H_2$ are removed.

6 Claims, 2 Drawing Sheets

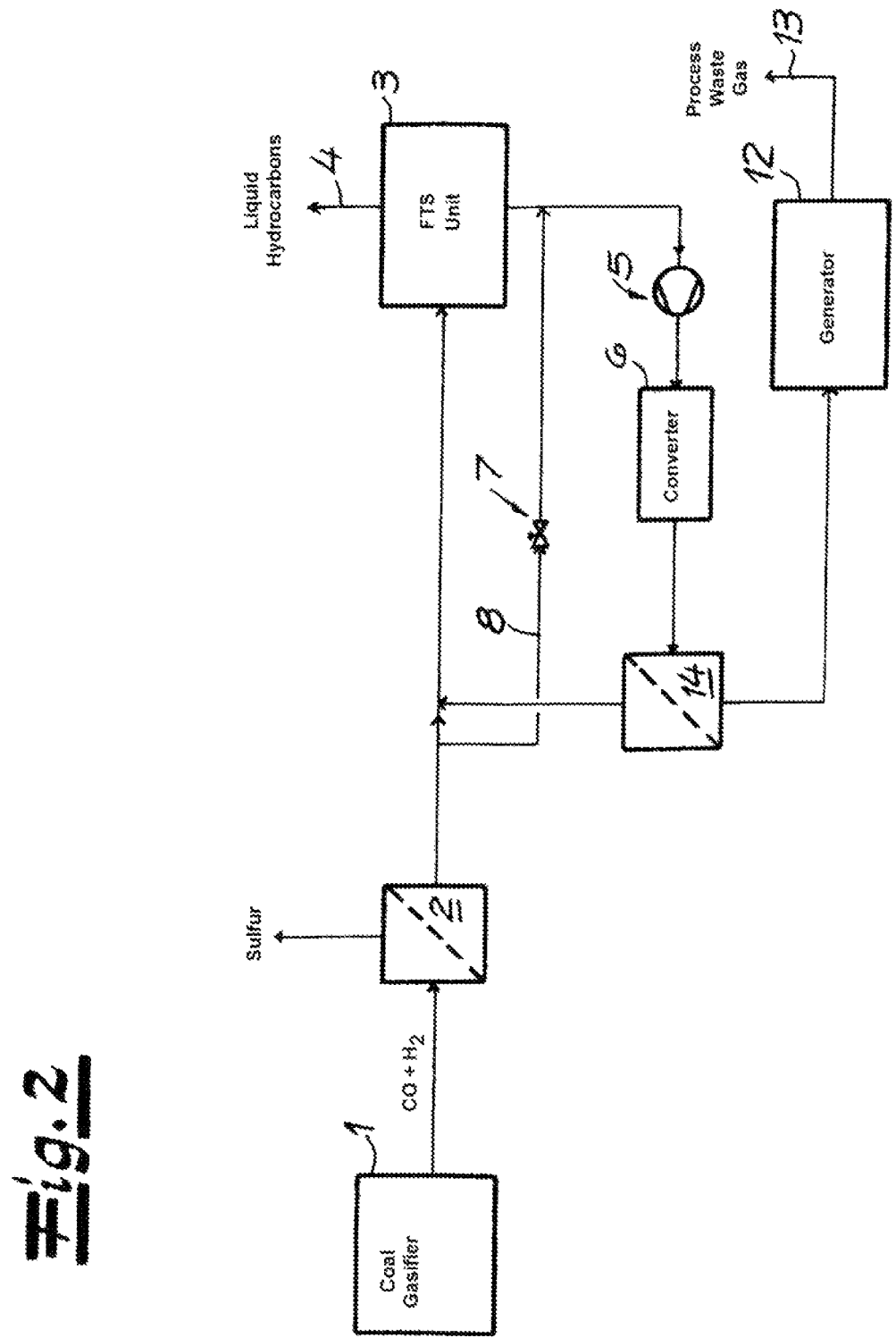

METHOD FOR OPERATING A FISCHER-TROPSCH SYNTHESIS

CROSS REFERENCE TO RELATED APPLICATIONS

This application is the US national phase of PCT application PCT/EP2009/003250, filed 7 May 2009, published 23 Dec. 2009 as 2009/152895, and claiming the priority of German patent application 102008025577.7 itself filed 28 May 2008, whose entire disclosures are herewith incorporated by reference.

FIELD OF THE INVENTION

The invention relates to a method of running a Fischer-Tropsch synthesis.

BACKGROUND OF THE INVENTION

The Fischer-Tropsch synthesis process (FTS) that is used to produce hydrocarbons has been known for many years now and is described, for example, in detail in Ullmanns Encyclopedia of Technical Chemistry, vol. 4, $14^{th}$ edition, pp. 329ff., Verlag Chemie, Weinheim (1977). In this method, raw gas, usually involving synthesis gas from coal gasification and composed primarily of carbon monoxide (CO) and hydrogen ($H_2$) after partial oxidation is converted into liquid hydrocarbons by heterogeneous catalysis. Aside from the remaining residual FTS gas, what is generated in particular are liquid products, in particular, aliphatic compounds and olefins. The FTS process has once again gained in importance in light of the fact that the cost of refined petroleum products has been increasing at a steady rate in recent years.

In plants operated today that have a Fischer-Tropsch synthesizer (FTS unit), the goal in terms of achieving an optimal yield is a gas composition having an $H_2$:CO molar ratio of approximately 2:1 when using predominantly iron-based catalysts. In order to improve the utilization of the CO and $H_2$ components contained in the input gas, a portion of the FTS product gas is compressed and recycled back into the input gas stream. The recycle ratio is selected here such that up to two times the quantity of the input gas is recirculated. The recycle ratio is limited by the fact that the inert gas fraction, such as nitrogen, argon, and carbon dioxide ($CO_2$), is successively increased as the recycling is repeated, and due to this factor no additional recycling is economically useful. Specifically, the $CO_2$ component increases disproportionately in the process gas since a portion of the CO input is converted to $CO_2$. This limits the yield of the input raw gas to recycle ratios of less than 2.5, where the remaining residual gas still containing CO and $H_2$ is discharged from the process.

The molar ratio $H_2$:CO of a synthesis gas obtained from coal gasification is approximately 1:3, and is thus fundamentally unsuited for direct feed to a Fischer-Tropsch synthesis reactor. In current plant designs, a partial stream of the raw gas is therefore processed before being fed to the FTS unit, where pretreatment of the process gas is essentially composed of a desulfurization stage and a CO converter. A differentiation is made here between sulfur-containing conversion (sour shift) and desulfurized conversion (sweet shift). The $H_2$:CO molar ratio in the process gas is adjusted in both cases by reacting part of the contained CO with steam to produce $H_2$ and $CO_2$.

Since a relatively high energy requirement is incurred in the process, in part due to the required compressor capacity, a partial stream of the residual FTS gas is fed to an energy recovery stage to improve the energy balance. One or more gas turbines are used here in combination with one or more generators to generate electric current that is in turn supplied to the plant when in operation.

OBJECT OF THE INVENTION

With this background in mind, the object of the invention is to provide a method by which the yield of the input gas from coal gasification can be improved without incurring a significantly higher cost in terms of equipment than would be required by the prior art.

SUMMARY OF THE INVENTION

In the method according to the invention, raw gas containing CO and $H_2$ from a coal gasification process is desulfurized and subsequently fed directly as input gas to a Fischer-Tropsch synthesizer in which hydrocarbons are produced by catalytic reactions of carbon oxides and hydrogen. The hydrocarbons are separated out as liquid products. A CO-containing and $CO_2$-containing gas stream leaving the FTS synthesizer is compressed and fed to a converter stage in which CO is converted with steam into $H_2$ and $CO_2$. After a gas treatment in which the $CO_2$ and/or components other than $H_2$ are removed, the gas leaving the converter is recycled as $H_2$-enriched gas together with the desulfurized input gas into the Fischer-Tropsch synthesizer. The resulting advantageous aspect here is that the cost of desulfurization is reduced due to the direct feed of the desulfurized raw gas since it is only unconverted process gas that must be desulfurized. In addition, the CO content of the process gas is below 20% as determined by the process when the process gas enters the converter. It is therefore sufficient to equip the converter with only one reactor. In conventional processes, the CO component entering the converter is more than 50%, with the result that here a second reactor as well as a heat exchanger are required for the conversion.

If the proportion of the hydrogen in the recycled gas is insufficient for the desired adjustment of the input gas composition needed to implement the Fischer-Tropsch synthesis, a partial stream of the desulfurized input gas can be diverted and fed into the recirculated gas stream upstream of the compressor. This approach enables the $H_2$ component to be increased in the gas stream that is fed to the FTS reactor.

An $H_2$:CO molar ratio of at least 1.5:1 is set in this gas stream. A ratio of 2:1 is preferred in terms of the FTS product yield.

In terms of the gas treatment, several methods are available for removing the $CO_2$ from the recycled gas. The gas treatment for the gas stream leaving the converter can be composed of a gas scrubber. This process according to the invention provides a higher raw gas yield since the $CO_2$ generated in the FTS unit is almost completely removed from the FTS recycle gas, and this reduces the stream of recirculating gas. As compared with previous process designs, this allows for a higher level of enrichment of the inert gas constituents in the process gas, and this results in the concentrations of CO and $H_2$ in the discharged residual gas from the Fischer-Tropsch synthesis being significantly lower than in previous designs.

In another variant of the method, provision is made whereby a partial stream is discharged from the gas stream leaving the synthesizer so as to prevent light hydrocarbons and inert-gas components from being excessively enriched. The discharged partial stream is supplied to a gas turbine for recovery of energy.

Use of the arrangement of process steps according to the invention makes it possible either to increase the yield of FTS product in the reactor with the same quantity of input gas, or to reduce the dimensions of the FTS reactor but with the same yield of FTS product, which approach ultimately results in a reduction in cost. The smaller size of the reactor also results in a smaller recycle gas stream as well as in a smaller compressor.

An alternative embodiment of the method according to the invention consists in using pressure-swing adsorption to gas treat the gas stream leaving the converter, where essentially pure hydrogen is accumulated on the pressure side, as the result of which any enrichment of undesirable components is negligible and thus no additional discharge stream is required. The almost pure hydrogen thus obtained is mixed with the input gas and recycled into the synthesizer. Furthermore, a gas mixture is accumulated at a lower pressure level that is used to generate steam in a waste-heat boiler. The steam thus generated is supplied to a steam turbine for recovery of energy. As a result, both the use of one or more costly gas turbines and also expensive gas scrubbing, such as are utilized in conventional process designs, are eliminated. The generation of electrical power by a steam turbine, to which a waste-heat boiler and a steam generator as connected on the upstream side, has the added advantage that electrical power generation could be ensured at a high level of availability by means of the energy recovery stage through the use of an alternative fuel in the event of a breakdown in the coal gasification. In addition, this variant of the method without directly accumulating residual FTS gas eliminates the small pressure-swing adsorber required by conventional process designs that generate $H_2$ for hydrogenation of heavy Fischer-Tropsch products. Provision can furthermore be made whereby the gas stream leaving the pressure-swing adsorption stage is compressed and then supplied to a gas turbine.

An additional object of the invention is a plant for running a Fischer-Tropsch synthesis. Included in its fundamental design are a Fischer-Tropsch synthesizer that comprises a Fischer-Tropsch synthesis reactor, a liquid product separator, as well as a heavy-end recovery unit. Also included in the design of the plant according to the invention is an upstream apparatus for desulfurizing a raw gas generated by coal gasification and containing CO and $H_2$, and a recycling device for recycling a gas stream leaving the Fischer-Tropsch synthesizer into the desulfurized input gas that is supplied to the Fischer-Tropsch synthesizer. In order to recycle the gas stream, the recycling device has a compressor, a steam-driven converter for converting CO into $H_2$ and $CO_2$, as well as an apparatus for removing $CO_2$ from the recirculated gas stream.

In an advantageous embodiment of the plant according to the invention, the device for recycling the gas stream is connected through a branch line to a line carrying the desulfurized input gas, where the branch line is connected to the recycling device upstream in the flow direction of the compressor. When the plant is started up, for example, this line enables a small partial stream from the desulfurizer to be carried directly to the converter until a sufficient amount of FTS product gas is present.

In another embodiment of the plant according to the invention, provision is made whereby the apparatus for removing $CO_2$ has a gas scrubber, where the gas scrubber can optionally be operated using a physical solvent. In a preferred embodiment of the plant, the apparatus for removing $CO_2$ has a pressure-swing-operated adsorber to carry out the pressure-swing adsorption. Provision can be made here whereby a gas scrubber is located upstream of the pressure-swing adsorption, thereby enabling a separation of $CO_2$ for purposes of $CO_2$ sequestration.

BRIEF DESCRIPTION OF THE DRAWINGS

The following discussion describes the invention in detail based on a drawing illustrating only one embodiment. The figures are schematic diagrams where:

FIG. 2 is a schematic process diagram comprising an adsorber for pressure-swing adsorption.

DETAILED DESCRIPTION OF THE DRAWINGS

Figure 1:
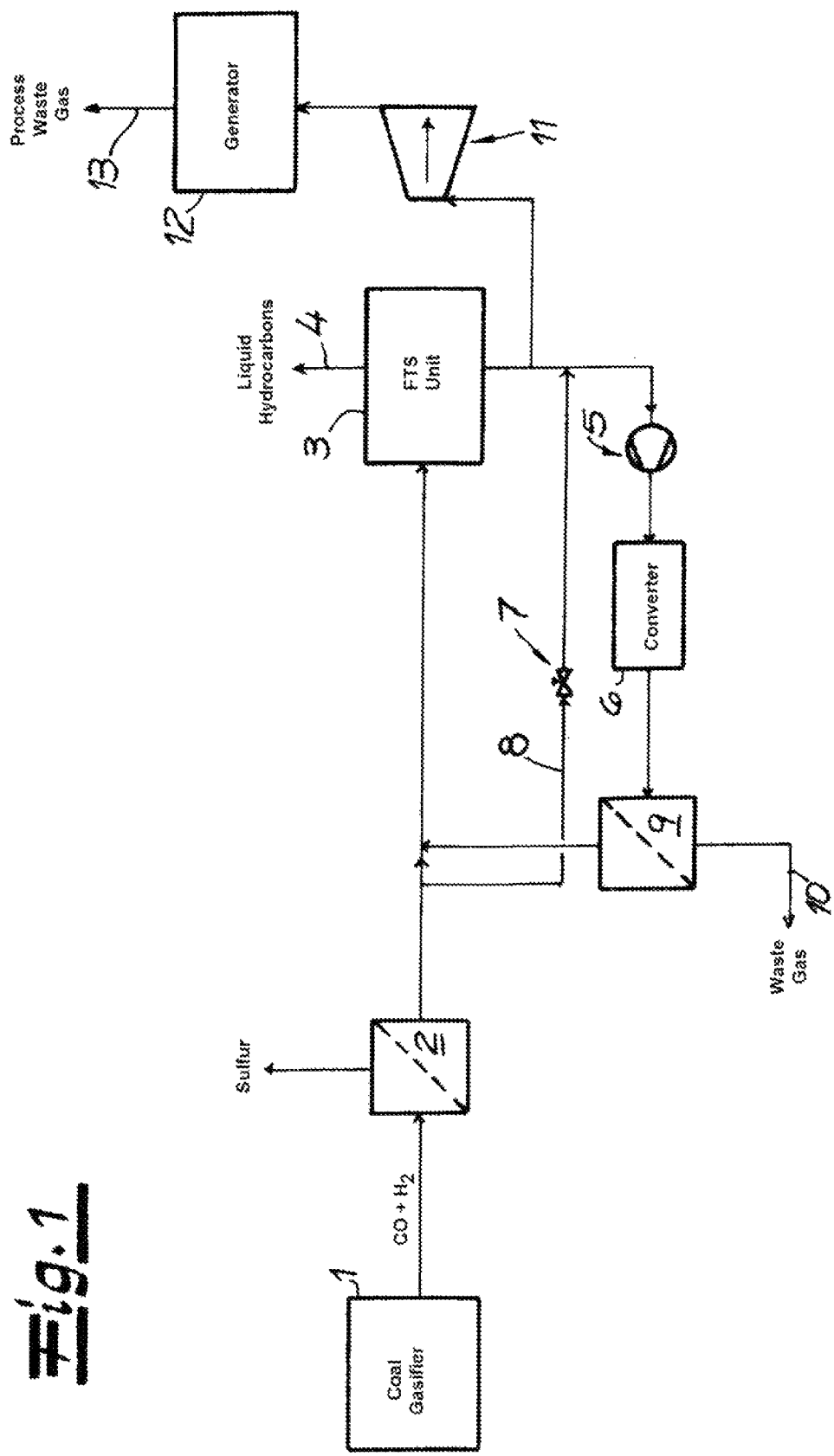
FIG. 1 is a schematic process diagram comprising a $CO_2$ scrubber.

The method according to the invention, which is illustrated schematically in the drawing, basically comprises: first desulfurizing a raw gas containing CO and $H_2$ that comes from a coal gasification stage 1 in an apparatus for desulfurization 2, and then feeding this as input gas at an $H_2$:CO ratio of at least 1.5:1 to a Fischer-Tropsch synthesizer 3 in which hydrocarbons are formed by catalytic reactions, the hydrocarbons being separated in the form of liquid products 4. The CO-containing and $CO_2$-containing gas stream leaving the Fischer-Tropsch synthesizer 3 is compressed in a compressor 5, and then fed to a converter 6 in which CO is reacted with steam using the sweet-shift process and converted to $H_2$ and $CO_2$. The gas stream is then fed from there to a gas treatment in which the $CO_2$ is removed. Coming from the gas treatment, the $H_2$-rich process gas together with the desulfurized input gas is recycled into the Fischer-Tropsch synthesizer 3. In the method according to the invention as illustrated in the drawing, a partial stream of the desulfurized input gas is additionally diverted through a branch line 8 equipped with a valve 7 and is fed upstream of the compressor 5 into the recirculated gas stream.

In the method illustrated in FIG. 1, the gas treatment of the gas stream leaving the converter is composed of a gas scrubber 9. The $CO_2$ is withdrawn from the process as waste gas 10. A partial stream from the gas stream leaving the Fischer-Tropsch synthesizer 3 is discharged and supplied to a gas turbine 11 for purposes of energy recovery, which turbine is connected to a generator module 12. In one variant of the plant, a heavy-end-recovery unit can also be connected to this gas turbine on the upstream side. The gas remaining from the energy recovery is withdrawn as process waste gas 13.

The method illustrated in FIG. 2 also shows that the gas treatment for the gas stream leaving the converter 6 is a pressure-swing adsorption stage, where essentially pure hydrogen is accumulated on the pressure side of an adsorber 14, the hydrogen being mixed with the input gas and returned to the Fischer-Tropsch synthesizer 3. At the same time, a gas mixture is also accumulated at a lower pressure level that is utilized to generate steam in a waste-heat boiler by which a steam turbine connected to generator module 12 is driven to generate electrical power. Process waste gas 13 is discharged from the energy recovery stage.

The invention claimed is:

1. A method of running a Fischer-Tropsch synthesis, the method comprising the steps of:
   (a) desulfurizing a raw gas containing carbon oxides from coal gasification and then combining the desulfurized raw gas with an $H_2$ rich gas obtained downstream to obtain an input gas stream, having an $H_2$/CO molar ratio of at least 1.5:1 and feeding the input gas stream to a Fischer-Tropsch synthesizer to produce, by catalytic reactions, hydrocarbons from the input gas;

(b) separating out the hydrocarbons as liquid products from the input gas to obtain a CO-containing and $CO_2$-containing process gas stream in which the CO content is below 20% and removing the CO-containing and $CO_2$-containing process gas stream from the Fischer-Tropsch synthesizer;

(c) compressing the CO-containing and $CO_2$-containing process gas stream leaving the Fischer-Tropsch synthesizer, feeding the compressed gas to a converter in which the CO in the compressed gas reacts with steam to convert the CO to $H_2$ and $CO_2$ in the gas stream and removing said converted gas stream from the converter;

(d) carrying out a gas treatment following step (c), to remove the $CO_2$ and/or constituents other than $H_2$ from the converted gas stream to obtain an $H_2$ rich gas stream, and combining the $H_2$ rich gas stream together with the desulfurized raw gas according to step (a) as the input gas stream fed into the Fischer-Tropsch synthesizer; and (e) diverting a partial stream of the desulfurized raw gas, obtained according to step (a), from the Fischer-Tropsch synthesizer, and prior to step (c), feeding the partial stream of the diverted desulfurized raw gas upstream of the compressor into the recirculated gas stream.

2. The method according to claim 1 further comprising the step of (f) setting an $H_2$:CO molar ratio of at least 2:1 in the input gas stream that is fed according to step (a) to the Fischer-Tropsch synthesizer.

3. The method according to claim 1 wherein the gas treatment of the gas stream leaving the converter according to step (d) is composed of a gas scrubber.

4. The method according to claim 3, further comprising the step of (f) discharging a partial stream from the $H_2$ rich gas stream obtained according to step (d) and feeding it to a gas turbine for energy recovery.

5. The method according to claim 1 in which a pressure-swing adsorber is used for the gas treatment of the converted gas stream according to step (d), wherein essentially pure hydrogen is accumulated on a higher pressure side of the pressure swing adsorber according to step (d) and that is mixed with the raw desulfurized gas and combined as the input gas stream according to step (a) in the Fischer-Tropsch synthesizer, and following step (d), a gas mixture comprising carbon monoxide, carbon dioxide and hydrogen is accumulated at a lower pressure side of the pressure swing adsorber, following and using the accumulated gas to generate steam in a waste-heat boiler.

6. The method according to claim 5, in which the accumulated gas mixture leaving the lower pressure side of the pressure-swing adsorption stage is compressed and supplied to a gas turbine.

* * * * *